March 4, 1958

C. L. GRIFFIN 2,825,585

PRESTRESSED SHRUNK-FITTED ROTARY DRILL
COLLAR AND TOOL JOINT

Filed July 1, 1954

Claude L. Griffin
INVENTOR.

BY Murray Robinson
ATTORNEY

United States Patent Office 2,825,585
Patented Mar. 4, 1958

2,825,585

PRESTRESSED SHRUNK-FITTED ROTARY DRILL COLLAR AND TOOL JOINT

Claude L. Griffin, Oklahoma City, Okla., assignor, by mesne assignments, to American Iron & Machine Works Company, Inc., Oklahoma City, Okla., a corporation of Delaware Application July 1, 1954, Serial No. 440,633

1 Claim. (Cl. 285—115)

This invention pertains to pipe connections, and more particularly to screw-threaded shrink-fitted connections between drill collars and tool joints used at the lower end of a string of drill pipe next above the drill bit in the rotary method of drilling wells, e. g. oil wells.

The object of the invention is to provide such a connection that will not fail in use.

Other objects and advantages of the invention will appear from the following description of a preferred embodiment thereof, reference being made to the accompanying drawings wherein:

Figure 1 is an axial section through the connection betwen the end portion of a drill collar and a tool joint;

Figure 2 is an axial section through a splice between the ends of two drill collar portions, using a double socket coupling; and Figure 3 is an axial section through a direct splice between the ends of two drill collar portions.

Referring now to Figure 1 there is shown the end of a drill collar 10 connected to a tool joint 11. The tool joint shown has a pin end 12 for making a screw connection to the socket end of a similar tool joint or the like. The invention is equally applicable to a connection between a drill collar and a tool joint having a socket instead of pin 12. The socket or the pin 12, as the case may be, will have a coarse thread that is sufficiently rugged to withstand repeated making and breaking of the screw connection between it and another tool joint. For convenience in reference, the end of the tool joint that connects to another tool joint will be called the joint end and the end that connects to the drill collar or other similar pipe will be called the collar end.

There is a socket at the collar end of the tool joint comprising a conical or tapered smooth portion 20, a cylindrical threaded portion 21, a smaller diameter smooth cylindrical portion 22, and at the bottom of the socket a shoulder 23 that is square or perpendicular to the joint axis.

There is a pin at the end of the drill collar comprising a square end or extremity 30, a smooth cylindrical neck 31, a screw threaded cylindrical portion 32, and a tapered smooth portion 33. There is a cylindrical undercut at 34 slightly below the root diameter of the thread on portion 42.

The socket at the collar end of the tool joint is shrink fitted to the pin on the drill collar in the same manner as described in my prior U. S. Patent Number 2,636,753, isued April 28, 1953, for connecting a tool joint to a drill pipe. The taper of conical portions 20 and 33 is therefore made no greater than the critical taper as defined in my aforesaid patent.

A drill collar is distinguished from a drill pipe by the thick or heavy wall of a drill collar as compared to a drill pipe. For example, the thickness of a piece of drill pipe is indicated by the dotted line 40 representing the outer wall of a drill pipe of the same inside diameter as the drill collar. For connecting such a drill pipe to a tool joint as described in the aforesaid patent, the end of the pipe is upset to form a thicker wall at 41, on which is formed a tapered portion 42 which has a much smaller taper angle. The end 43 of the socket in the collar end of the tool joint is much thicker. It is to be noted that the outer diameter of the tool joint at 44 is much larger than even the diameter of the upset portion 41 of the drill pipe. On the other hand, the outer diameter of the drill collar 10 is substantially the same as that of the tool joint 11.

In attempting to adapt the invention of my aforementioned patent to drill collars, it was at first thought that it would only be necessary to provide a tapered shoulder 45 to connect the tapered portion 42 to the larger outer diameter of the drill collar in place of shoulder 46 connecting the upset portion 41 with the smaller outer diameter 40 of the drill pipe. It was found, however, that in some cases the connection between tool joint and drill collar failed by breaking across the section of the drill collar between shoulder 45 and tool joint end 43 as indicated at 47. The present invention is directed to the elimination of such failures.

According to the present invention, in place of the portion 42 of slight taper and the shoulder 45 there is substituted the more steeply tapered portion 33 which is continuous from the full wall thickness section 48 of the drill collar down to the undercut portion 34 adjacent threaded portion 32. This causes the mouth end portion 50 of the tool joint socket to be of reduced wall thickness so that the stress due to the shrink fit places the inner surface 51 of the end of the mouth portion close to the elastic limit, say about 80% of the elastic limit.

Then when the connection is subjected to bending moments, as is the case when the drill string employing the connection is in use and is rotated in a well bore, the added stress due to the bending moment will cause the metal at the inner surface 51 of mouth 50 to stress relief, that is, the metal will be stressed beyond its elastic limit so that when the stress falls below the elastic limit again as the bending moment is periodically relieved when the drill pipe rotates, the metal will not fully recover and return to its original size. In this manner the mouth of the box will be permanently slightly enlarged, thereby loosening the grip of the tool joint on the drill collar at this point compared to the tightness that would have been obtained if the mouth of the box had been thicker and hence strong enough so that its elastic limit was not exceeded. This permits a more gradual bending of the drill collar adjacent the mouth of the tool joint socket, thereby lowering the stress concentration at this point.

The increased taper angle of conical portions 20 and 33 also causes an increase in wall thickness of the drill collar at section 47. This increase is such that the wall thickness is greater than the wall thickness at section 60 of the tool joint pin which is the weakest point of the standard A. P. I. tool joint to tool joint connection. Therefore, the weakest point of the connection of tool joint to drill collar will be stronger than the weakest point of the joint to joint connection. It is to be noted that the dimension 60 is also defined relative to a tool joint 61 shown in dashed lines having a socket on its joint end, the dimension 60 being equal to the difference between the internal radius of the mouth of the socket adjacent section 60 and the internal radius of the tool joint at its mid portion 62.

The loosening of the grip between surfaces 20 and 33 due to the stress relief at the surface 51 not only reduces the stress concentration at the adjacent part of the drill collar but transfers some of the stress to undercut portion 34 where there will be considerable flexure as the connection bends during use. To prevent fatigue failure at this point due to the increased bending, the undercut portion is cold rolled or cold worked or in other manner prestressed, to place its surface fibres in initial compression sufficient so that they always are in compression even when the connection is bent. By eliminating stress reversal during flexure, fatigue failure at undercut portion 34 is eliminated.

It will be seen that since the thickness of drill collar section 48 has been increased, compared to the thickness of a drill pipe, to the point where it is thicker than section 47, the increased stiffness of the drill collar tends to concentrate the stress at section 47, and that through the invention this bending stress has been distributed throughout the length of tapered shrink fitted portion 33 and undercut portion 34 by increasing the taper angle so that section 47 is more than twice as thick as portion 50 rather than substantially equal in thickness. The thicker section at 47 resists compression more strongly thereby helping to bring this portion 50 near the elastic limit to cause its stress relief and the consequent stress redistribution. The increased thickness also insures that section 47 will be stronger than section 60.

Referring now to Figure 2 there are shown two drill collars 70 and 71 spliced together by means of a coupling 72. There is a socket in each end of the coupling 72 which is identical in construction to the socket of tool joint 11 previously described. The ends of drill collars 70 and 71 are identical to the end of drill collar 10 previously described. The two halves of coupling 72 are integral rather than screwed together as would be the case if two tool joints were used in place of coupling 72. This splice is intended to be of a more permanent nature and not to be made and broken repeatedly like a tool joint to tool joint connection. Coupling 72, like tool joint 11, has an outer diameter substantially the same as that of the drill collars 70 and 71.

Figure 3 shows how the invention is applied in a direct splice between two drill collars 80 and 81. The pin on the end of collar 80 is identical with that on collar 10 previously described. The socket in the end of collar 81 is identical with the socket in the collar end of tool joint 11.

While preferred embodiments of the invention have been shown and described, modifications thereof can be made by one skilled in the art without departing from the spirit of the invention and it is intended to protect by Letters Patent all forms of the invention falling within the scope of the following claim.

I claim:

For use in conjunction with drill pipe in a tubular drill string useful in the rotary method of well drilling wherein the drill string is subjected to bending moments as the drill string rotates, in combination, an integral collar having a thick wall compared to drill pipe and including a long cylindrical main body portion of uniform inner and outer diameters, said drill collar having a pin on one end including a smooth conical portion starting at the end of said main body portion of the drill collar and tapering down toward the end of the pin, a threaded portion on the pin nearer the end of the pin than said conical portion, the internal diameter of said conical and threaded portions of the pin being the same as that of the main body portion of the drill collar, and a tool joint having a joint end formed as one element of a tool joint pin element and socket element connection and having on its collar end a socket, a smooth conical portion on the interior of said socket flaring toward the mouth of the socket, a threaded portion on the interior of the socket adjacent said smooth conical portion, said conical and threaded portions of the socket being correlative to said conical and threaded portions of the pin when the socket is at a higher temperature than said pin, said pin and socket being shrink fitted together, the wall thickness of the mouth of said socket being substantially less than the wall thickness of the correlative portion of the pin which in turn is greater than the maximum wall thickness of the pin element of said tool joint connection but is less than the wall thickness of the main body of the drill collar, the length of said conical portion of the pin being greater than the length of said conical portion of said socket, said tool joint and drill collar having substantially the same outer diameter, the interior of the mouth of said socket being stressed close to its elastic limit, whereby the application of bending moment to the combination during drilling will cause stress relief of said interior of the mouth of the socket, said pin having a smooth undercut cold rolled flexure portion of smaller diameter than the root diameter of the threaded portion of the pin located intermediate between said threaded portion and the smaller diameter end of the conical portion of the pin and facing the smaller diameter part of the smooth conical portion of the socket.

References Cited in the file of this patent
UNITED STATES PATENTS

| | | |
|---|---|---|
| 1,517,428 | Jahraus | Dec. 2, 1924 |
| 2,160,263 | Fletcher | May 30, 1939 |
| 2,211,179 | Stone | Aug. 13, 1940 |
| 2,574,081 | Abegg | Nov. 6, 1951 |
| 2,636,753 | Griffin | Apr. 28, 1953 |
| 2,641,488 | Dunn et al. | June 9, 1953 |

UNITED STATES PATENT OFFICE
CERTIFICATE OF CORRECTION

Patent No. 2,825,585　　　　　　　　　　　　　　　March 4, 1958

Claude L. Griffin

It is hereby certified that error appears in the printed specification of the above numbered patent requiring correction and that the said Letters Patent should read as corrected below.

Column 1, line 57, for the reference numeral "42" read -- 32 --.

Signed and sealed this 27th day of May 1958.

(SEAL)
Attest:

KARL H. AXLINE　　　　　　　　　　　　　　　　　ROBERT C. WATSON
Attesting Officer　　　　　　　　　　　　　　　　Commissioner of Patents